United States Patent
Kim et al.

(10) Patent No.: US 12,255,352 B2
(45) Date of Patent: Mar. 18, 2025

(54) LITHIUM SECONDARY BATTERY SEPARATOR HAVING ENHANCED ADHESIVE STRENGTH TO ELECTRODE AND IMPROVED RESISTANCE CHARACTERISTICS, AND LITHIUM SECONDARY BATTERY COMPRISING LITHIUM SECONDARY BATTERY SEPARATOR

(71) Applicant: LG ENERGY SOLUTION, LTD., Seoul (KR)

(72) Inventors: Bong-Tae Kim, Daejeon (KR); Joo-Sung Lee, Daejeon (KR); Kil-An Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 537 days.

(21) Appl. No.: 17/632,186

(22) PCT Filed: Oct. 29, 2020

(86) PCT No.: PCT/KR2020/014969
§ 371 (c)(1),
(2) Date: Feb. 1, 2022

(87) PCT Pub. No.: WO2021/086088
PCT Pub. Date: May 6, 2021

(65) Prior Publication Data
US 2022/0223977 A1  Jul. 14, 2022

(30) Foreign Application Priority Data
Oct. 29, 2019 (KR) .................. 10-2019-0135852

(51) Int. Cl.
*H01M 50/451* (2021.01)
*H01M 50/426* (2021.01)
(Continued)

(52) U.S. Cl.
CPC ....... *H01M 50/451* (2021.01); *H01M 50/426* (2021.01); *H01M 50/431* (2021.01); *H01M 50/491* (2021.01)

(58) Field of Classification Search
CPC ............. H01M 50/451; H01M 50/426; H01M 50/431; H01M 50/491
(Continued)

(56) References Cited

U.S. PATENT DOCUMENTS

| | | |
|---|---|---|
| 5,882,721 A | 3/1999 | Delnick |
| 6,432,586 B1 | 8/2002 | Zhang |

(Continued)

FOREIGN PATENT DOCUMENTS

| | | |
|---|---|---|
| CN | 102341939 A | 2/2012 |
| CN | 108463904 A | 8/2018 |

(Continued)

OTHER PUBLICATIONS

João C. Barbosa et al., Recent Advances in Poly(vinylidene fluoride) and Its Copolymers for Lithium-Ion Battery Separators, Jul. 19, 2018 (Year: 2018).*

(Continued)

*Primary Examiner* — Ekandra S. Miller-Cruz
*Assistant Examiner* — Kevin Nguyen
(74) *Attorney, Agent, or Firm* — Birch, Stewart, Kolasch & Birch, LLP

(57) ABSTRACT

A lithium secondary battery separator with excellent adhesive strength and air permeability is disclosed. The lithium secondary battery separator includes a porous polymer substrate; and a porous coating layer containing inorganic particles and a binder. When the binder is present as a binder specimen with a thickness of 0.4 mm after pressurization at 190° C., the binder specimen comprises a first binder having a tan δ peak at 15° C. to 27.6° C. and a second binder having (Continued)

a tan δ peak at 8° C. to 20.2° C., as measured by dynamic mechanical analysis (DMA).

11 Claims, 5 Drawing Sheets

(51) Int. Cl.
*H01M 50/431* (2021.01)
*H01M 50/491* (2021.01)

(58) Field of Classification Search
USPC .......................................................... 429/247
See application file for complete search history.

(56) References Cited

U.S. PATENT DOCUMENTS

| | | | |
|---|---|---|---|
| 9,202,631 | B2 | 12/2015 | Wakizaka et al. |
| 9,812,688 | B2 | 11/2017 | Park et al. |
| 10,096,810 | B2 | 10/2018 | Kim et al. |
| 10,581,045 | B2 | 3/2020 | Lee et al. |
| 11,177,536 | B2 | 11/2021 | Jang et al. |
| 2011/0045338 | A1 | 2/2011 | Bae et al. |
| 2012/0219840 | A1 | 8/2012 | Choi et al. |
| 2016/0164060 | A1* | 6/2016 | Zhang ................ H01M 50/414 429/144 |
| 2019/0031504 | A1 | 1/2019 | Choi et al. |
| 2019/0048233 | A1 | 2/2019 | Cowman-Eggert et al. |
| 2020/0358064 | A1 | 11/2020 | Kwon et al. |

FOREIGN PATENT DOCUMENTS

| | | | |
|---|---|---|---|
| CN | 108603079 | A | 9/2018 |
| EP | 3 764 424 | A1 | 1/2021 |
| EP | 3 996 193 | A1 | 5/2022 |
| JP | 10-334877 | A | 12/1998 |
| JP | 2001-319634 | A | 11/2001 |
| JP | 2014-179330 | A | 9/2014 |
| JP | 2016-72155 | A | 5/2016 |
| KR | 10-2011-0005793 | A | 1/2011 |
| KR | 10-2013-0126445 | A | 11/2013 |
| KR | 1430975 | B1 * | 8/2014 ........... B32B 27/304 |
| KR | 10-2014-0144192 | A | 12/2014 |
| KR | 10-2016-0129762 | A | 11/2016 |
| KR | 10-2018-0075471 | A | 7/2018 |
| KR | 10-1943491 | B1 | 1/2019 |
| KR | 10-2019-0052651 | A | 5/2019 |
| KR | 10-2017568 | B1 | 9/2019 |
| KR | 10-2063627 | B1 | 2/2020 |
| WO | WO 2018/055882 | A1 | 3/2018 |
| WO | WO 2019/112323 | A1 | 6/2019 |

OTHER PUBLICATIONS

Screen captures from YouTube video clip entitled "Dynamic Mechanical Analyser DMA, " 2 pages, uploaded on Jun. 14, 2017 by user "USQ Centre for Future Materials". Retrieved from Internet: <https://www.youtube.com/watch?v=IxVeSTBPOcl>. (Year: 2017).*
Solef® 21510/1001. Datasheet [online]. Synesqup, [retrieved on Jul. 30, 2024]. Retrieved from the Internet: <URL: https://www.syensqo.com/en/product/solef-215101001>. (Year: 2024).*
Neoflon VT-475. Datasheet [online]. knowde, [retrieved on Jul. 30, 2024]. Retrieved from the Internet: <URL: https://www.knowde.com/stores/daikin/products/neoflon-vt-475>. (Year: 2024).*
Solef® 32008. Datasheet [online]. Omnexus, [retrieved on Jul. 30, 2024]. Retrieved from the Internet: <URL: https://omnexus.specialchem.com/product/t-syensqo-solef-32008>. (Year: 2024).*
International Search Report for PCT/KR2020/014969 (PCT/ISA/210) mailed on Feb. 23, 2021.
Jayasuriya et al., "Electrostrictive and ferroelectric properties of P(VDF/TrFE)/P(VDF/HFP) copolymer blends", Proceedings of SPIE, vol. 4329, Jul. 16, 2001, pp. 125-130.
Extended European Search Report for European Application No. 20880692.7, dated Nov. 9, 2022.

* cited by examiner

LITHIUM SECONDARY BATTERY SEPARATOR HAVING ENHANCED ADHESIVE STRENGTH TO ELECTRODE AND IMPROVED RESISTANCE CHARACTERISTICS, AND LITHIUM SECONDARY BATTERY COMPRISING LITHIUM SECONDARY BATTERY SEPARATOR

TECHNICAL FIELD

The present application claims priority to Korean Patent Application No. 10-2019-0135852 filed on Oct. 29, 2019 in the Republic of Korea. The present disclosure relates to a separator for a lithium secondary battery having improved adhesion to an electrode and resistance characteristics, and a lithium secondary battery including the same.

BACKGROUND ART

A lithium secondary battery is an energy storage device which has a fundamental structure of positive electrode/negative electrode/separator/electrolyte, and is an energy storage device which can be charged/discharged through reversible conversion between chemical energy and electrical energy and shows high energy density. Such lithium secondary batteries are used widely for compact electronic devices, such as cellular phones, notebook computers, or the like. Recently, application of lithium secondary batteries has been extended rapidly to hybrid electric vehicles (HEV), plug-in electric vehicles (plug-in EV), electric bikes (e-bikes) and energy storage systems (ESS) as a countermeasure to environmental problems, high oil price, energy efficiency and energy storage.

Securement of safety is an important problem to be solved in manufacturing and using such lithium secondary batteries. Particularly, a separator used generally in a lithium secondary battery shows a severe heat shrinking behavior at high temperature or under other conditions due to its material property and characteristics during its manufacturing process to cause a safety-related problem, such as an internal short-circuit. Recently, there has been suggested an organic-inorganic composite porous separator having a porous inorganic coating layer formed by coating a mixture of inorganic particles with a binder on a porous polymer substrate in order to ensure the safety of a lithium secondary battery. However, when forming an electrode assembly by stacking electrodes and separators, interlayer adhesion is not sufficient. Thus, it is highly likely that the electrode and separator are separated from each other. In this case, there is a problem in that the inorganic particles detached during the separation may function as local defects in the device.

To solve the above-mentioned problem, there has been used a method for forming an adhesive layer by inducing migration of a binder polymer toward the surface of a separator through a phase separation of a PVDF-based polymer, such as poly(vinylidene fluoride-co-hexafluoropropylene) (PVDF-HFP) or poly(vinylidene fluoride-co-chlorotrifluoroethylene) (PVDF-CTFE) so that the coating layer of the separator may be provided with adhesive force.

It is known that when using such a PVDF-based polymer in the adhesive layer of a separator, the adhesion of the PVDF-based polymer and the resistance characteristics thereof have a trade-off relationship. In other words, it is known that a PVDF-based polymer having excellent adhesion is disadvantageous in terms of resistance, while a PVDF-based polymer having advantageous resistance characteristics is disadvantageous in terms of adhesion.

DISCLOSURE

Technical Problem

The present disclosure is designed to solve the problems of the related art, and therefore the present disclosure is directed to providing a separator for a lithium secondary battery provided with a porous coating layer including inorganic particles, and having adhesion to an electrode and resistance characteristics improved at the same time to a level enough to satisfy the requirements in the art.

The present disclosure is directed to providing a separator for a lithium secondary battery satisfying both adhesion to an electrode and resistance characteristics by adjusting the rheological properties, such as viscosity and elasticity, of a binder used for the porous coating layer.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to the first embodiment of the present disclosure, there is provided a separator for a lithium secondary battery including: a porous polymer substrate; and a porous coating layer on at least one surface of the porous polymer substrate, wherein the porous coating layer comprises a binder and inorganic particles wherein each inorganic particles has a binding state, wherein the binder bonds the inorganic particles to one another, wherein the inorganic particles may retain their binding states, and wherein the binder bonds the inorganic particles to the porous polymer substrate and the inorganic particles they may retain their binding states, the inorganic particles form interstitial volumes, wherein the inorganic particles are in contact with one another, and the interstitial volumes among the inorganic particles become vacant spaces to form pores of the porous coating layer, and when the binder is present as a binder specimen having a thickness of 0.4 mm after pressurization at 190° C., wherein the binder specimen includes a first binder having a tan δ peak at 15° C. to 27.6° C. and a second binder having a tan δ peak at 8° C. to 20.2° C., as determined by dynamic mechanical analysis (DMA).

According to the second embodiment of the present disclosure, there is provided the separator for a lithium secondary battery as defined in the first embodiment, wherein the binder of the porous coating layer includes the first binder and the second binder.

According to the third embodiment of the present disclosure, there is provided the separator for a lithium secondary battery as defined in the first or the second embodiment, wherein the binder further includes a third binder, and when the third binder is present in the binder specimen having a thickness of 0.4 mm after pressurization at 190° C., the binder specimen has a tan δ peak at −12° C. to 0° C., as determined by dynamic mechanical analysis (DMA).

According to the fourth embodiment of the present disclosure, there is provided the separator for a lithium secondary battery as defined in the third embodiment, wherein the third binder is present in an amount of 8 wt % to 25 wt % based on 100 wt % of a total weight of the first binder, the second binder and the third binder.

According to the fifth embodiment of the present disclosure, there is provided the separator for a lithium secondary battery as defined in the third or the fourth embodiment, wherein the third binder includes poly(vinylidene fluoride-co-chlorotrifluoroethylene)-(PVDF-CTFE).

According to the sixth embodiment of the present disclosure, there is provided the separator for a lithium secondary battery as defined in any one of the first to the fifth embodiments, wherein the first binder is present in an amount of 5 wt % to 50 wt % and the second binder is present in an amount of 50 wt % to 95 wt %, based on 100 wt % of a combined weight of the first binder and the second binder.

According to the seventh embodiment of the present disclosure, there is provided the separator for a lithium secondary battery as defined in any one of the first to the sixth embodiments, wherein when the first binder is present as a binder specimen having a thickness of 0.4 mm after pressurization at 190° C., the binder specimen has a behavior at a phase angle of less than 45°, as determined by an advanced rheometric expansion system (ARES) at 190° C.

According to the eighth embodiment of the present disclosure, there is provided the separator for a lithium secondary battery as defined in any one of the first to the seventh embodiments, wherein when the second binder present as a binder specimen having a thickness of 0.4 mm after pressurization at 190° C., the binder specimen has a behavior at a phase angle of 45° or more, as determined by an advanced rheometric expansion system (ARES) at 190° C.

According to the ninth embodiment of the present disclosure, there is provided the separator for a lithium secondary battery as defined in any one of the first to the eighth embodiments, wherein the first binder is present in an amount of 5 wt % to 15 wt % and the second binder is present in an amount of 85 wt % to 95 wt %, based on 100 wt % of a combined weight of the first binder and the second binder.

According to the tenth embodiment of the present disclosure, there is provided the separator for a lithium secondary battery as defined in any one of the first to the ninth embodiments, wherein the first binder satisfying the tan $\delta$ peak condition is at least one of poly(vinylidene fluoride-tetrafluoroethylene) (PVDF-TFE), poly(vinylidene fluoride-trifluoroethylene) (PVDF-TrFE), PVDF-HFP-acrylic acid graft copolymer (PVDF-HFP-AA) or a mixture thereof.

According to the eleventh embodiment of the present disclosure, there is provided the separator for a lithium secondary battery as defined in any one of the first to the tenth embodiments, wherein the second binder satisfying the tan $\delta$ peak condition is poly(vinylidene fluoride-hexafluoropropylene) (PVDF-HFP).

According to the twelfth embodiment of the present disclosure, there is provided the separator for a lithium secondary battery as defined in any one of the first to the eleventh embodiments, wherein the porous coating layer further includes a dispersing agent.

In another aspect, according to the thirteenth embodiment of the present disclosure, there is provided a lithium secondary battery including a positive electrode, a negative electrode and a separator interposed between the positive electrode and the negative electrode, wherein the separator is the separator for a lithium secondary battery as defined in any one of the first to the twelfth embodiments.

Advantageous Effects

The separator for a lithium secondary battery according to the present disclosure uses two types of binders as binders used for a porous coating layer so that preferred rheological properties, such as viscosity and elasticity, may be realized, and thus satisfies both adhesion to an electrode and resistance characteristics.

In addition, fine and uniform pores are formed on the surface of the separator for a lithium secondary battery according to the present disclosure to provide an increased adhesive surface area to an electrode, resulting in improvement of adhesion to an electrode.

Further, the lithium secondary battery including the separator for a lithium secondary battery according to the present disclosure shows excellent life, safety and high output characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
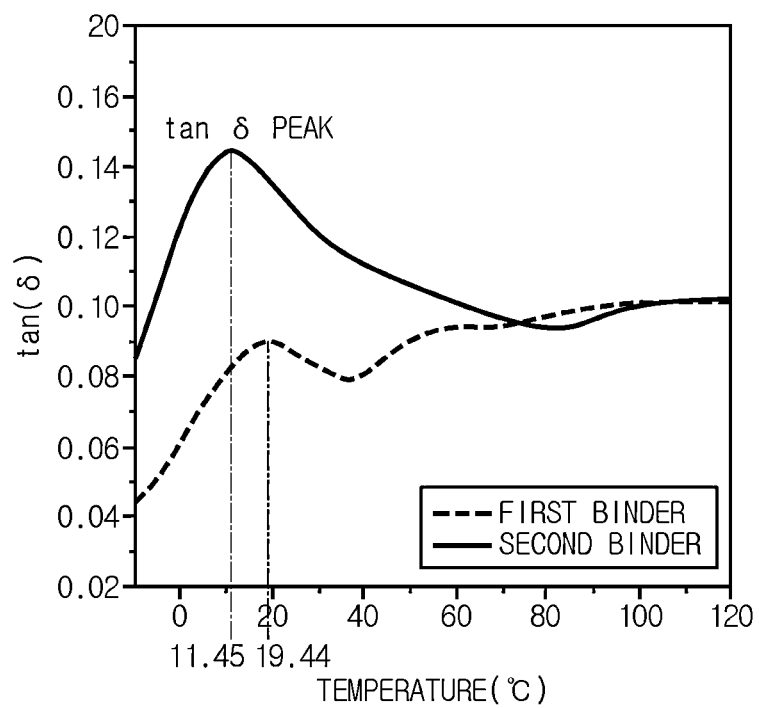
FIG. 1 is a graph illustrating the relationship between temperature and tan $\delta$ for each of the first binder and the second binder used in Examples 1 and 2, as determined by dynamic mechanical analysis (DMA).

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a separator for a lithium secondary battery including: a porous polymer substrate; and a porous coating layer formed on at least one surface of the porous polymer substrate and including a binder mixed with inorganic particles, wherein the binder bonds the inorganic particles to one another so that the inorganic particles may retain their binding states, and bonds the inorganic particles to the porous polymer substrate so that they may retain their binding states, the inorganic particles form interstitial volumes, while they are substantially in contact with one another, the interstitial volumes among the inorganic particles become vacant spaces to form the pores of the porous coating layer, and when the binder is formed into a binder specimen having a thickness of 0.4 mm by pressurization at 190° C., the binder specimen includes a first binder having a tan $\delta$ peak at 15-27.6° C. and a second binder having a tan $\delta$ peak at 8-20.2° C., as determined by dynamic mechanical analysis (DMA).

In another aspect of the present disclosure, there is provided a lithium secondary battery including a positive electrode, a negative electrode and a separator interposed between the positive electrode and the negative electrode, wherein the separator is the separator for a lithium secondary battery according to an embodiment of the present disclosure.

Hereinafter, each constitutional element will be explained in more detail.

1. Porous Polymer Substrate

According to an embodiment of the present disclosure, the porous polymer substrate provides a lithium ion transport channel, while insulating a negative electrode and a positive electrode electrically from each other to prevent a short-circuit. Any material may be used with no particular limitation, as long as it is used conventionally as a material of a separator for a lithium secondary battery. Particular examples of the porous polymer substrate include porous polymer substrates made of at least one polymer resin selected from polyolefins, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene, but are not limited thereto.

In addition, the porous polymer substrate may be a sheet-like film formed by melting a polymer resin. Preferably, the porous polymer substrate is a porous polymer substrate provided in the form of a sheet-like film formed by melting the above-mentioned polymer resin.

Particularly, the porous polymer substrate may be any one of the following a) to c):
a) A porous film formed by melting and extruding a polymer resin;
b) A multilayer film formed by stacking two or more layers of the porous films of a); and
c) A porous composite film having a multilayer structure including both a) and b).

According to an embodiment of the present disclosure, the porous polymer substrate may have a thickness of 5-50 µm. The thickness of the porous polymer substrate is not limited to the above-defined range. However, when the thickness is excessively smaller than the above-defined lower limit, the separator shows poor mechanical properties and may be damaged with ease during the use of a battery. Meanwhile, the size of pores present in the porous polymer substrate and the porosity thereof are not particularly limited, but may be 0.01-50 µm and 10-95%, respectively.

2. Porous Coating Layer

According to an embodiment of the present disclosure, a porous coating layer is formed on one surface or both surfaces of the porous polymer substrate. The porous coating layer includes a mixture of a plurality of inorganic particles with a binder polymer, and the inorganic particles are integrated by means of the binder polymer to form a layer. The binder of the porous coating layer allows the inorganic particles to be bonded to one another to retain their binding state (i.e. the inorganic particles are connected with one another and fixed by the binder). In addition, the inorganic particles can retain their binding state to the porous polymer substrate by the binder. The inorganic particles in the porous coating layer form interstitial volumes, while being in substantially in contact with one another. Herein, the interstitial volumes mean spaces defined by the inorganic particles facing one another substantially in a closely packed or densely packed structure of the inorganic particles. The interstitial volumes among the inorganic particles become vacant spaces to form the pores of the porous coating layer.

When the surface of the porous polymer substrate is coated with the porous coating layer including inorganic particles as described above, it is possible to further improve heat resistance and mechanical properties. In other words, since the inorganic particles generally do not undergo a change in physical properties even at a high temperature of 200° C., the separator for a lithium secondary battery has excellent heat resistance by virtue of the porous coating layer.

According to an embodiment of the present disclosure, the porous coating layer has a thickness of 1-50 µm, 2-30 µm, or 2-20 µm. When the porous coating layer has a thickness within the above-defined range, the separator may be formed into a thin film and may be provided with low resistance characteristics and high heat resistance.

The weight ratio of the inorganic particles to the binder polymer in the porous coating layer is determined considering the thickness, pore size and porosity of a finished porous coating layer. According to an embodiment of the present disclosure, the inorganic particles are used in an amount of 50-99.9 wt % or 60-99.5 wt % and the binder polymer is used in an amount of 0.1-50 wt % or 0.5-40 wt %. When the content of the inorganic particles is less than 50 wt %, the quality of a finished battery may be degraded due to an excessively high content of the binder polymer, a decrease in vacant spaces formed among the inorganic particles and a decrease in pore size and porosity. On the contrary, when the content of the inorganic particles is larger than 99.9 wt %, the mechanical properties of a finished porous coating layer may be degraded due to an excessively low content of the binder polymer and reduction of the adhesion among the inorganic particles.

When the binder used for the porous coating layer for a lithium secondary battery according to the present disclosure is formed into a binder specimen having a thickness of 0.4 mm by pressurization at 190° C., the binder specimen includes a first binder having a tan δ peak at 15-27.6° C. and a second binder having a tan δ peak at 8-20.2° C., as determined by dynamic mechanical analysis (DMA). Herein, DMA is carried out by using DMA Q800 available from TA Instruments. In addition, the term 'peak' used herein refers to the top point, i.e. the point having the largest height in a curve plotting a relationship between tan δ and temperature. Alternatively, 'peak' may refer to a knee point where the slope of the tangent line of a graph is changed from a positive (+) value to a negative (−) value.

According to the present disclosure, the first binder generally tends to show a large change in viscosity depending on temperature, high elasticity, low solubility to a solvent and rigid properties like a solid.

According to the present disclosure, the first binder satisfying the above-defined tan δ peak condition may be PVDF-TFE, PVDF-TrFE, PVDF-HFP-acrylic acid graft copolymer (PVDF-HFP-AA) or a mixture thereof.

According to the present disclosure, the second binder satisfying the above-defined tan δ peak condition may be PVDF-HFP.

According to an embodiment of the present disclosure, the porous coating layer includes the first binder and the second binder as binders. According to another embodiment of the present disclosure, the binder used for the porous coating layer according to the present disclosure substantially includes the first binder and the second binder. According to still another embodiment of the present disclosure, the binder used for the porous coating layer according to the present disclosure consists of the first binder and the second binder.

According to an embodiment of the present disclosure, the binder may include the first binder in an amount of 5-50 wt % and the second binder in an amount of 50-95 wt %, based on 100 wt % of the combined weight of the first binder and the second binder. When the content of the first binder is less than the lower limit, a large amount of microvoids is present in the coating layer to provide reduced resistance, but shows decreased density of the porous coating layer to cause a problem of a significant decrease in thickness of the porous coating layer upon the lamination with an electrode for manufacturing a battery. In addition, in this case, physical strength is reduced to cause degradation of penetration strength or over-charge safety. Meanwhile, when the content of the first binder is larger than the upper limit, there is a problem of degradation of adhesion. According to another embodiment of the present disclosure, the binder may include the first binder in an amount of 5-15 wt % and the second binder in an amount of 85-95 wt %, based on 100 wt % of the combined weight of the first binder and the second binder. According to still another embodiment of the present disclosure, the binder may include the first binder in an amount of 14-50 wt % and the second binder in an amount of 50-86 wt %, based on 100 wt % of the combined weight of the first binder and the second binder.

According to an embodiment of the present disclosure, when the first binder is formed into a binder specimen having a thickness of 0.4 mm by pressurization at 190° C., the binder specimen may show a behavior at a phase angle of less than 45°, while the second binder may show a behavior at a phase angle of 45° or more under a complex modulus value of $10^5$ Pa or less, as determined by an advanced rheometric expansion system (ARES) at 190° C. When the second binder shows a behavior at a phase angle of 45° or more under a complex modulus value of $10^5$ Pa or less, the second binder may show softening properties under a condition of lamination of an electrode with the separator, i.e. under a hot press condition.

Herein, the phase angle (δ) is determined by using an ARES instrument having a model name of ARES-G2 available from TA Instruments.

Particularly, the phase angle (δ) is determined as follows:
(S1) A binder resin specimen is loaded on the parallel plate of an ARES instrument and set with a gap of 1 mm from the 25 mm parallel plate.
(S2) A ratio of viscosity modulus to loss modulus is determined from the ARES instrument under the conditions of a temperature of 190° C., 1% of stress and a shear rate of 0.05-5 rad/s. The determined value corresponds to the arctan value of the phase angle.
(S3) The arctan value is converted into a tan δ (at a shear rate=100 rad/s) value. In this manner, the phase angle is calculated.

According to an embodiment of the present disclosure, the phase angle of the first binder is not determined at a complex modulus of less than about $10^5$ Pa, and the first binder shows a rheological behavior with a phase angle of less than 45° at a complex modulus of about $10^5$-$10^6$ Pa. The expression 'the first binder has a complex modulus value at a phase angle of less than 45°' means that the first binder has a tan δ value of less than 1 (i.e. an arctan value of larger than 1), and a ratio of viscosity modulus to loss modulus (viscosity modulus/loss modulus) of larger than 1.

According to an embodiment of the present disclosure, the second binder may have a phase angle of 45° or more at a complex modulus value of about $10^5$ Pa or less, particularly at a complex modulus value of about $10^3$ Pa to about $10^5$ Pa. The expression 'the second binder has a phase angle of 45° or more at a complex modulus value of about $10^5$ Pa or less' means that the second binder has a tan δ value of 1 or more (i.e. an arctan value of less than 1), and a ratio of viscosity modulus to loss modulus (viscosity modulus/loss modulus) of less than 1.

According to an embodiment of the present disclosure, when determining a change in complex viscosity of a binder depending on a change in frequency, the first binder shows a larger complex viscosity as compared to the second binder, which suggests that the first binder has a larger weight average molecular weight as compared to the second binder. In addition, the first binder shows a relatively larger change in complex viscosity, while the second binder shows a relatively smaller change in complex viscosity.

According to an embodiment of the present disclosure, each of the first binder and the second binder may be expressed in terms of storage modulus and loss modulus. In general, storage modulus represents a polymer whose elasticity is predominant, and loss modulus represents a polymer whose viscosity is predominant. A difference in hardness or viscosity depending on a degree of rigidity or mobility of the main chain forming each of the first binder and the second binder may be inferred from the measurements of storage modulus and loss modulus, wherein the first binder may show a higher storage modulus as compared to the second binder and the second binder may show a higher loss modulus as compared to the first binder, in a temperature range where a lithium secondary battery is operated, for example, at a temperature of 0° C. or higher. In other words, it can be inferred that the first binder shows predominant elasticity as compared to the second binder and the second binder shows predominant viscosity as compared to the first binder, in a temperature range where a lithium secondary battery is operated, for example, at a temperature of 0° C. or higher.

Meanwhile, according to an embodiment of the present disclosure, the binder may further include a third binder. When the third binder is formed into a binder specimen having a thickness of 0.4 mm by pressurization at 190° C., the binder specimen has a tan δ peak at −12° C. to 0° C., preferably −11° C. to −4° C., in a temperature range of −20° C. to 50° C., as determined by dynamic mechanical analysis (DMA).

Figure 7:
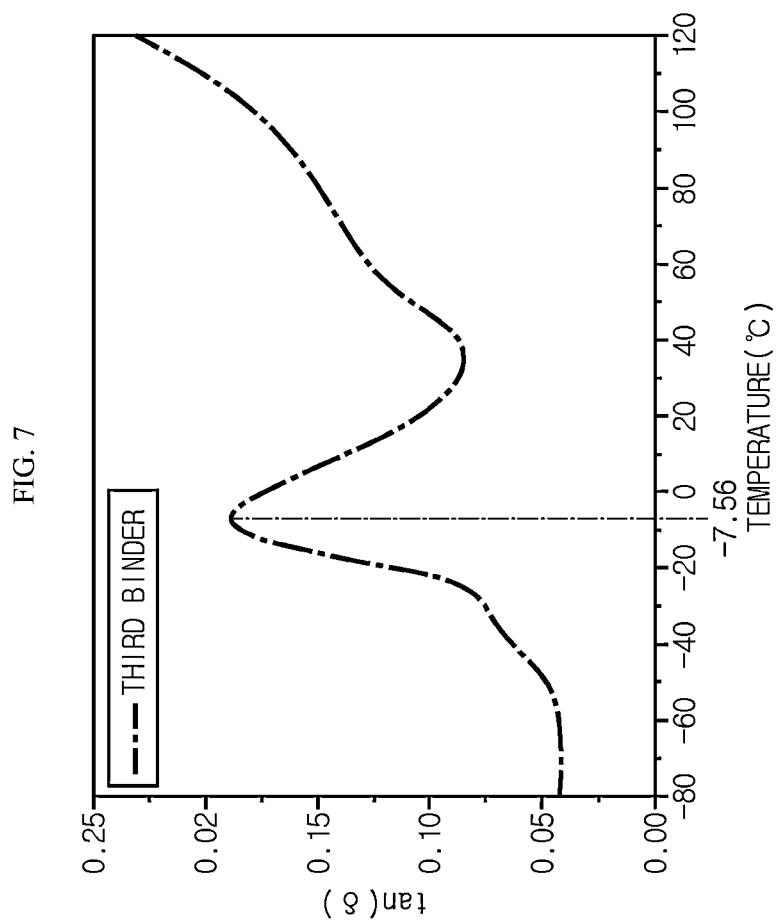
FIG. 7 is a graph illustrating the relationship between temperature and tan $\delta$ for the third binder used in each of Examples 3-6, as determined by dynamic mechanical analysis (DMA).

Non-limiting examples of the third binder include poly (vinylidene fluoride-co-chlorotrifluoroethylene) (PVDF-CTFE). It can be seen from FIG. 7 that PVDF-CTFE (Solef 32008) used as the third binder according to the present disclosure has a tan δ at about −7.56° C.

Meanwhile, the third binder may be present in an amount of 8-25 wt % based on 100 wt % of the total weight of the first binder, the second binder and the third binder.

When the separator including the porous coating layer is manufactured and then is applied to a battery, loss of the binder may occur due to dissolution of the binder contained in the porous coating layer in an electrolyte, or the like. According to the present disclosure, the binder may include a predetermined amount of the third binder, and thus the separator according to the present disclosure may provide an effect of reducing dissolution of the binder in the porous coating layer. Particularly, the problem of dissolution of the binder in an electrolyte may become severe, when the internal temperature of a battery is increased. In general, aging is carried out at a temperature of 60° C. or higher for the purpose of accelerating impregnation of a separator with an electrolyte, after manufacturing a battery. While such aging is carried out, the binder resin in the porous coating layer may be dissolved out by the electrolyte, resulting in degradation of binding force of the porous coating layer. As a result, the porous coating layer may be removed from the porous substrate or the inorganic particles in the porous coating layer may be detached undesirably. Therefore, the third binder may be further introduced according to the present disclosure to reduce dissolution of the binder in the electrolyte.

According to an embodiment of the present disclosure, although there is no particular limitation in the particle size of the inorganic particles of the porous coating layer, the inorganic particles may have a particle size of 0.001-10 μm, 0.01-10 μm, 0.05-5 μm, or 0.1-2 μm with a view to formation of a coating layer having a uniform thickness and suitable porosity. When the size of the inorganic particles satisfies the above-defined range, the inorganic particles maintain dispersibility to facilitate controlling the physical properties of a separator for a lithium secondary battery. In addition, it is possible to avoid an increase in thickness of the porous coating layer to improve the mechanical properties. Further, it is less likely that an internal short-circuit occurs during the charge/discharge of a battery due to an excessively large pore size.

Herein, 'particle diameter $D_{50}$' means a particle diameter at a point of 50% in the particle number accumulated distribution depending on particle diameter, and may be determined by using a laser diffraction method. Particularly, powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine $D_{50}$.

There is no particular limitation in the inorganic particles, as long as they are electrochemically stable. In other words, there is no particular limitation in the inorganic particles, as long as they cause no oxidation and/or reduction in the range (e.g. 0-5 V based on Li/Li$^+$) of operating voltage of an applicable electrochemical device. Particularly, when using inorganic particles having ion transportability, it is possible to increase the ion conductivity in an electrochemical device and to assist improvement of quality. In addition, when using inorganic particles having a high dielectric constant, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, or 10 or more, inorganic particles having lithium ion transportability, or a mixture thereof. Non-limiting examples of the inorganic particles having a dielectric constant of 5 or more may include any one selected from the group consisting of $BaTiO_3$, $Pb(Zr,Ti)O_3$ (PZT), $Pb_{1-x}La_xZr_{1-y}Ti_yO_3$ (PLZT, wherein 0<x<1, 0<y<1), $Pb(Mg_{3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, γ-AlOOH, SiC and $TiO_2$, or a mixture of two or more of them. In addition, when using the inorganic particles having a high dielectric constant in combination with the inorganic particles having lithium ion transportability, it is possible to provide a synergic effect.

Non-limiting examples of the inorganic particles having lithium ion transportability include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (1<x<4, 0<y<13), such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, and $P_2S_5$-based glass ($Li_xP_yS_z$, 0<x<3, 0<y<3, 0<z<7), such as LiI—$Li_2S$—$P_2S_5$, or a mixture thereof.

According to an embodiment of the present disclosure, no dispersing agent may be used for the porous coating layer.

According to another embodiment of the present disclosure, the porous coating layer may further include a dispersing agent. The dispersing agent is used in an amount of 1-3 parts by weight based on 100 parts by weight of the solid content forming the porous coating layer and functions to improve the dispersibility of the inorganic particles. Non-limiting examples of the dispersing agent include any one selected from the polymeric compounds, such as acrylic copolymers, cyanoethyl polyvinyl alcohol, phenolic compounds, including baicalin, luteolin, taxifolin, myricetin, quercetin, rutin, catechin, epigallocatechin gallate, butein, piceatannol and tannic acid, pyrogallic acid, amylose, amylopectin, xanthane gum and fatty acid compounds, or a mixture of two or more of them.

The acrylic copolymers may be copolymers containing at least one functional group selected from the group consisting of OH, COOH, CN, amine and amide groups.

Particular examples of such acrylic copolymers include, but are not limited to: ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer, ethyl acrylate-acrylic acid-2-(diethylamino)ethyl acrylate copolymer, or two or more of them.

The pore size and porosity of the porous coating layer mainly depend on the size of the inorganic particles. For example, when using inorganic particles having a particle diameter of 1 µm or less, the resultant pores also have a size of 1 µm or less. Such a porous structure is filled with an electrolyte injected subsequently and the electrolyte functions to transport ions. Therefore, the pore size and porosity are important factors which affect control of the ion conductivity of the porous inorganic coating layer.

The porous inorganic coating layer according to an embodiment of the present disclosure may have a pore size of 0.001-10 µm or 0.001-1 µm, preferably.

The porosity of the porous inorganic coating layer may have a porosity of 5-95%, 10-95%, 20-90%, or 30-80%. The porosity corresponds to the value obtained by subtraction of the volume of the coating layer derived from the weight and density of each of the ingredients of the coating layer from the volume of the porous inorganic coating layer calculated from the thickness, width and length thereof.

When the porous inorganic coating layer has a pore size and porosity within the above-defined range, the separator for a lithium secondary battery according to an embodiment of the present disclosure may be prevented from a short-circuit occurring in an abnormal state and may be provided with suitable resistance characteristics and air permeability at the same time.

3. Method for Forming Porous Coating Layer

According to an embodiment of the present disclosure, the porous coating layer is formed by mixing the inorganic particles with the binder in a solvent to prepare a composition for forming a porous coating layer, and applying the composition onto a porous polymer substrate, followed by drying.

According to an embodiment of the present disclosure, the solvent is an organic solvent, and any organic solvent may be used with no particular limitation, as long as it can disperse the inorganic particles and the binder homogeneously.

Particular examples of the organic solvent include: cycloaliphatic hydrocarbons, such as cyclopentane and cyclohexane; aromatic hydrocarbons, such as toluene, xylene and ethylbenzene; ketones, such as acetone, ethyl methyl ketone, diisopropyl ketone, cyclohexanone, methylcyclohexane and ethylcyclohexane; chlorinated aliphatic hydrocarbons, such as methylene chloride, chloroform and tetrachlorocarbon; esters, such as ethyl acetate, butyl acetate, γ-butyrolactone and ε-caprolactone; acrylonitriles, such as acetonitrile and propionitrile; ethers, such as tetrahydrofuran and ethylene glycol diethyl ether; alcohols, such as methanol, ethanol, isopropanol, ethylene glycol and ethylene glycol monomethyl ether; and amides, such as N-methyl pyrrolidone and N,N-dimethylformamide. According to an embodiment of the present disclosure, the solvent may include acetone, considering an advantage during a drying process.

Such solvents may be used alone or in combination. Particularly, a solvent having a low boiling point and high volatility is preferred, since it can be removed at low temperature within a short time. Particularly preferred solvents include acetone, toluene, cyclohexanone, cyclopentane, tetrahydrofuran, cyclohexane, xylene, N-methyl pyrrolidone, or a mixed solvent containing two or more of them.

Preferably, the ratio of the inorganic particles to the binder in the composition is the same as described above with regard to the porous coating layer.

There is no particular limitation in the method for forming a porous coating layer by applying the composition onto a porous polymer substrate, and particular examples of the method include dip coating, die coating, roll coating, comma coating, doctor blade coating, reverse roll coating, direct roll coating, or the like.

The coating process for forming a porous coating layer is carried out preferably under a certain range of humidity. After coating the composition for forming a porous coating layer on either surface or both surfaces of a porous polymer substrate, the binder polymer dissolved in the coating layer (composition) has phase transition property through a vapor-induced phase separation phenomenon known to those skilled in the art. The phase separation may be carried out by humidified phase separation or dipping phase separation.

Hereinafter, humidified phase separation will be explained.

First, a non-solvent may be introduced in a gaseous state. The non-solvent is not particularly limited, as long as it cannot dissolve the binder and has partial miscibility with the solvent. For example, the non-solvent may be at least one selected from the group consisting of water, methanol, ethanol, isopropanol and butanol.

When a non-solvent is introduced and added in a gaseous state, there are advantages in that phase separation may be carried out by using a small amount of non-solvent and the inorganic composition may be dried with ease.

Herein, the non-solvent in a gaseous state may be added at a temperature of 15-70° C. When the temperature is lower than 15° C., the non-solvent hardly maintains its gaseous state and the inorganic composition is dried at a low rate, resulting in degradation of productivity. When the temperature is higher than 70° C., the solvent and the non-solvent are dried at an excessively high rate, thereby making it difficult to carry out phase separation sufficiently.

In addition, during the phase separation, the non-solvent is added in such a manner that the vapor pressure of the non-solvent may be 15-80%, or 30-50%, based on the saturated vapor pressure thereof, and then phase separation is carried out sequentially. When the vapor pressure of the non-solvent is less than 15% based on the saturated vapor pressure thereof, the amount of the non-solvent is too small to carry out phase separation sufficiently. When the vapor pressure of the non-solvent is larger than 80% based on the saturated vapor pressure thereof, phase separation occurs excessively, thereby making it difficult to form a uniform coating layer.

To carry out phase separation by adding a non-solvent in a gaseous state, it is advantageous that the solvent has a low boiling point and thus evaporates with ease. In other words, as the solvent evaporates to reduce the temperature, solvent exchange occurs with ease, while the gaseous non-solvent is condensed. According to an embodiment, when a gaseous non-solvent is added, the solvent may have a boiling point of 30-80° C. In addition, the solvent of the inorganic composition to which the gaseous non-solvent is added may be at least one selected from the group consisting of acetone and methyl ethyl ketone.

Hereinafter, dipping phase separation will be explained.

After coating the composition for forming a porous coating layer on at least one surface of a porous polymer substrate, the coated porous polymer substrate is dipped in a solidifying solution containing a suitable non-solvent for a predetermined time. In this manner, the bunder resin is solidified, while phase separation occurs in the coated composition for forming a porous coating layer. In this process, the coating layer including the binder resin and inorganic particles is converted into a porous layer. Then, the resultant product is washed with water to remove the solidifying solution, followed by drying, to form a porous coating layer integrally on the porous polymer substrate.

The solvent used for dissolving the binder may be one capable of dissolving the binder resin to 5 wt % or more, preferably 15 wt % or more, more preferably 25 wt % or more at 25° C. Non-limiting examples of the solvent include polar amide solvents, such as N-methyl pyrrolidone, dimethyl acetamide and dimethyl formamide, propanone, cyclopentanone, methyl acetate, gamma-butyrolactone, trimethyl phosphate, triethyl phosphate, and dimethyl ethoxymethane. When the solubility of the binder resin in the solvent is lower than the above-defined range, there is a problem in that phase separation may proceed excessively.

The non-solvent may be one providing the binder resin with a solubility of less than 5 wt % at 25° C. The non-solvent may include at least one selected from water, methanol, ethanol, propyl alcohol, butyl alcohol, butanediol, ethylene glycol, propylene glycol, and tripropylene glycol.

As the solidifying solution, the non-solvent may be used alone, or a mixed solvent of the non-solvent with the above-mentioned solvent may be used. When using a mixed solvent of the non-solvent with the solvent, the content of the non-solvent is 95 wt % or more based on 100 wt % of the solidifying solution with a view to formation of a high-quality porous structure and improvement of productivity.

According to an embodiment of the present disclosure, the separator for a lithium secondary battery may be dried after the phase separation. The drying may be carried out by a process known to those skilled in the art, and may be performed in a batchwise mode or continuous mode by using an oven or heating chamber in a temperature range considering the vapor pressure of the used solvent. The drying substantially removes the solvent present in the composition preferably at high rate, considering productivity, or the like. For example, the drying may be carried out for 1 minute or less, preferably for 30 seconds or less.

The porous coating layer may be formed on both surfaces of the porous polymer substrate, or selectively on one surface of the porous polymer substrate.

The separator for a lithium secondary battery obtained as described above may be used as a separator for an electrochemical device. The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

According to an embodiment of the present disclosure, a lithium secondary battery may be obtained by a conventional method known to those skilled in the art. According to an embodiment of the present disclosure, the secondary battery may be obtained by interposing the separator between a positive electrode and a negative electrode to prepare an electrode assembly, introducing the electrode assembly to a battery casing, and injecting an electrolyte thereto.

According to an embodiment of the present disclosure, the electrodes of the secondary battery may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium intercalation materials, such as lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium intercalation materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery. According to an embodiment of the present disclosure, as processes for applying the electrode assembly to a battery, lamination or stacking of a separator with electrodes and folding may be used in addition to a conventional winding process.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Example 1

Preparation of Composition for Forming Porous Coating Layer

As inorganic particles, $Al_2O_3$ powder having an average diameter $D_{50}$ of 500 nm was prepared.

As binders, two types of PVDF-based binders were prepared. Particularly, the first binder was a PVDF-TFE binder (VT-475 available from Daikin) having a rheological behavior with predominant elasticity, wherein when the binder was formed into a binder specimen having a thickness of 0.4 mm by pressurization at 190° C., the binder specimen had a tan δ peak at 15-27.6° C., as determined by dynamic mechanical analysis (DMA) using DMA Q800 available from TA Instruments. In addition, the second binder was a PVDF-HFP binder (Solef 21510 available from Solvay) having a rheological behavior with predominant viscosity, wherein when the binder was formed into a binder specimen having a thickness of 0.4 mm by pressurization at 190° C., the binder specimen had a tan δ peak at 8-20.2° C., as determined by dynamic mechanical analysis (DMA) using DMA Q800 available from TA Instruments.

FIG. 1 is a graph illustrating the relationship between temperature and tan δ for each of the first binder and the second binder. In FIG. 1, the first binder has a peak at about 19.44° C. and the second binder has a peak at about 11.45° C.

Figure 2:
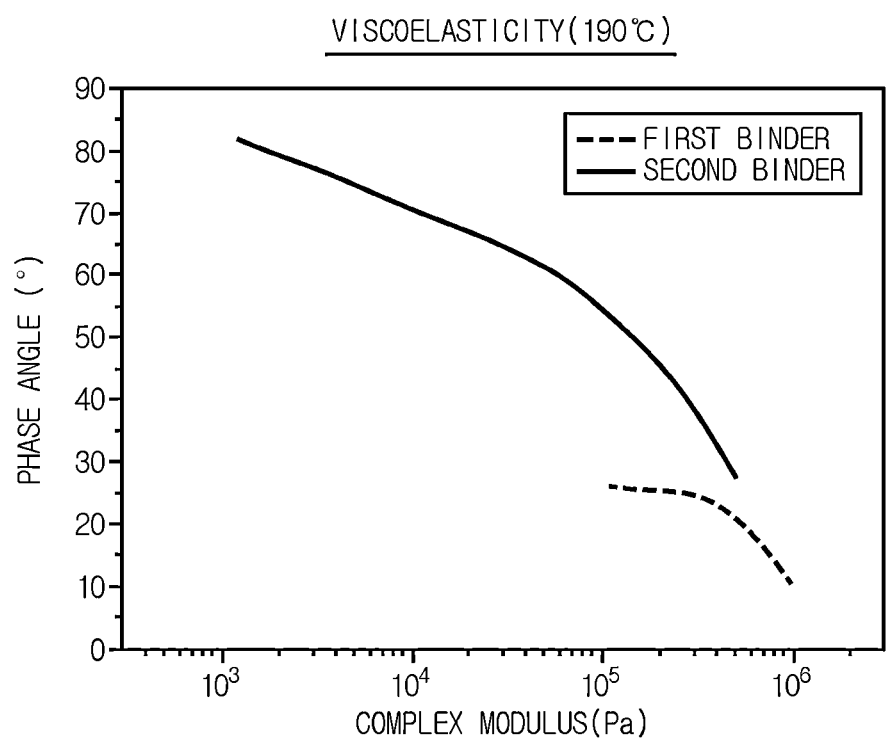
FIG. 2 is a graph illustrating the relationship between complex modulus at 190° C. and phase angle determined for each of the first binder and the second binder used in Examples 1 and 2.

In addition, FIG. 2 is a graph illustrating the relationship between complex modulus and phase angle for each of the first binder and the second binder. In FIG. 2, the first binder shows a rheological behavior with a phase angle of less than 30° at a complex modulus value of about $10^5$-$10^6$ Pa, and the second binder shows a rheological behavior with a phase angle of 45° more at a complex modulus value of about $10^5$ Pa or less, particularly about $10^3$-$10^5$ Pa.

Herein, the relationship between complex modulus and phase angle for each of the first binder and the second binder was determined by forming each of the first binder and the second binder into a binder specimen having a thickness of 0.4 mm by pressurization at 190° C., and analyzing the binder specimen with an advanced rheometric expansion system (ARES) at 190° C.

Figure 3:
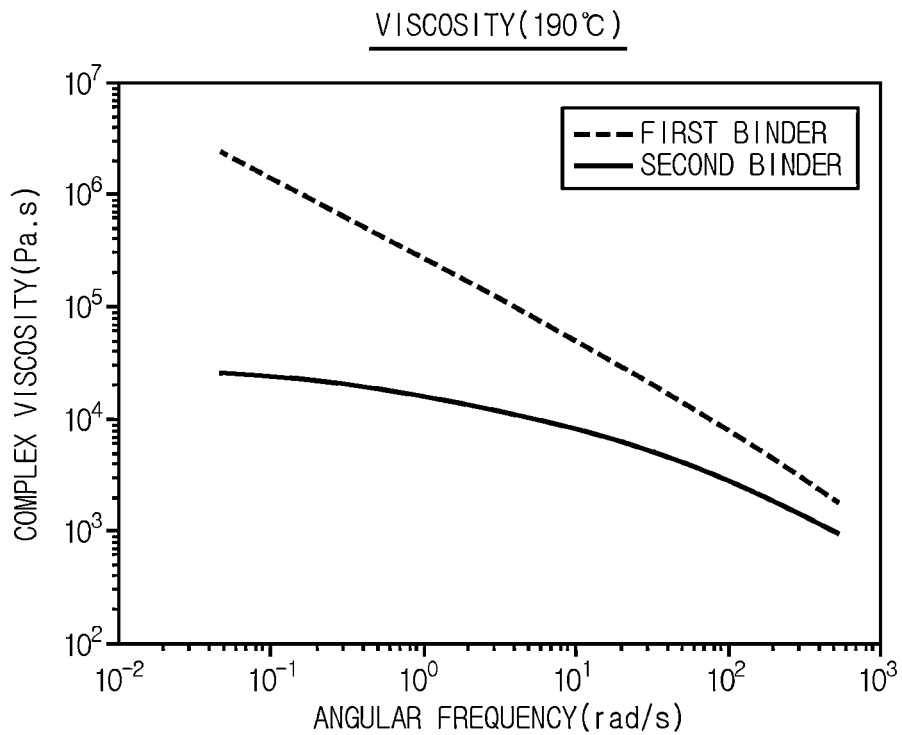
FIG. 3 is a graph illustrating the relationship between angular frequency at 190° C. and complex viscosity determined for each of the first binder and the second binder used in Examples 1 and 2.

In addition, FIG. 3 is a graph illustrating the relationship between angular frequency and complex viscosity for each of the first binder and the second binder. It can be inferred from FIG. 3 that the first binder has a larger weight average molecular weight as compared to the second binder, since the first binder has a higher complex viscosity as compared to the second binder. In addition, the first binder shows a relatively larger change in complex viscosity, while the second binder shows a relatively smaller change in complex viscosity.

Figure 4:
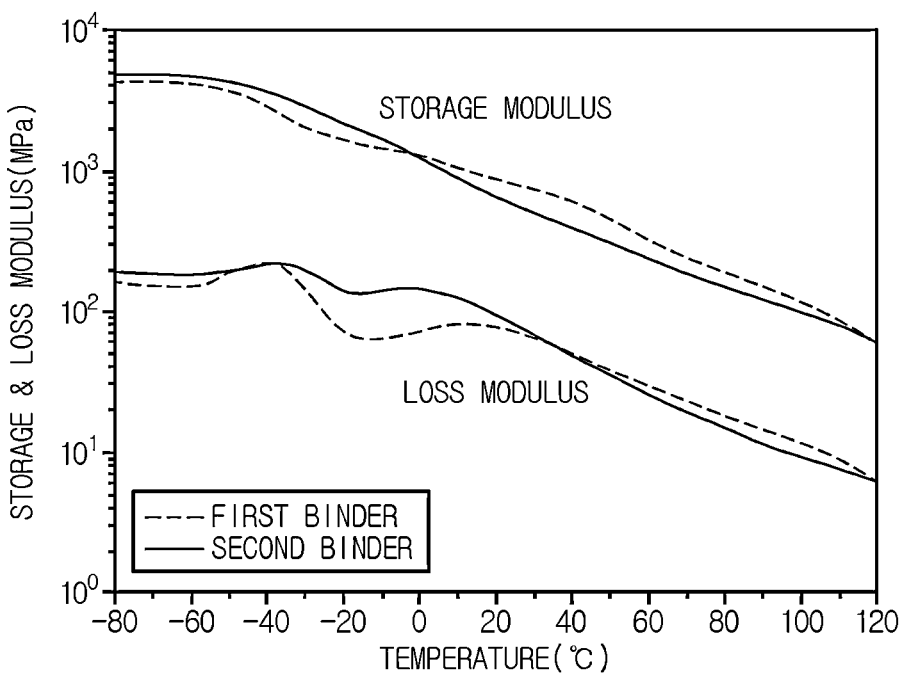
FIG. 4 is a graph illustrating the relationship between temperature and storage modulus and the relationship between temperature and loss modulus determined for each of the first binder and the second binder used in Examples 1 and 2.

Further, FIG. 4 is a graph illustrating the storage modulus and loss modulus as a function of temperature for each of the first binder and the second binder. It can be inferred from FIG. 4 that the first binder has higher elasticity at a temperature of about 0° C. or higher as compared to the second binder, since the first binder shows a higher storage modulus at a temperature of about 0° C. or higher as compared to the second binder. It can be also inferred from FIG. 4 that the second binder shows higher viscosity at a temperature of about −40° C. to about 20° C. as compared to the first binder and the first binder shows lower viscosity (i.e. flowability) as compared to the second binder, since the second binder shows a higher loss modulus at a temperature of about −40° C. to about 20° C. as compared to the first binder.

$Al_2O_3$ powder, the first binder and the second binder were prepared at a ratio of 65 wt %:5 wt %:30 wt %.

The first binder was mixed with the second binder, and the resultant mixture was dissolved in N-methyl pyrrolidone (NMP) as a solvent at room temperature (23° C.) for about 1 hour to prepare a binder composition. Then, the mixed inorganic particles were added to the binder composition. The binder composition including the inorganic particles were allowed to pass through a layer including beads with a diameter of 0.65 mm three to five times by using a bead mill so that the inorganic particles might be dispersed, thereby providing a composition for forming a porous coating layer. Herein, the composition for forming a porous coating layer was controlled to have a solid content of 20 wt %.

Formation of Porous Coating Layer on Porous Polymer Substrate

As a porous polymer substrate, a polyethylene porous polymer substrate having a size of 6 cm×15 cm (thickness 9 μm, porosity 43%, air permeation time 110 sec, resistance 0.45Ω) was prepared.

The composition for forming a porous coating layer was applied onto both surfaces of the polyethylene porous polymer substrate having a size of 6 cm×15 cm through a dip coating process. Then, the polyethylene porous polymer substrate coated with the composition for forming a porous coating layer was directly dipped in water as a non-solvent to carry out phase separation through solvent/non-solvent exchange. After that, the substituted non-solvent, water, was dried to obtain a separator for a lithium secondary battery provided with porous coating layers on both surfaces of the porous polymer substrate. The porous coating layer has a structure in which the binder bonds the inorganic particles to one another so that they may retain their binding states, and bonds the inorganic particles to the porous polymer substrate so that they may retain their binding state, the inorganic particles form interstitial volumes, while being in contact with one another, and the interstitial volumes among the inorganic particles become vacant spaces to form the pores of the porous coating layer. In addition, the porous coating layer has a structure also having pores generated upon the exchange between the solvent and the non-solvent, water, in the binder layer. The total coating amount of the porous coating layers applied to both surfaces of the porous polymer substrate was 5.8 g/m².

Example 2

A composition for forming a porous coating layer was prepared in the same manner as Example 1, except that $Al_2O_3$ powder, the first binder and the second binder were prepared at a weight ratio of 70:5:25. The composition was controlled to have a solid content of 20 wt %.

Then, a porous polymer substrate was prepared, and the composition was applied to one surface of the substrate to obtain a separator for a lithium secondary battery provided with a porous coating layer formed on one surface of the porous polymer substrate and including the binders mixed with the inorganic particles. The total coating amount of the porous coating layer was 5.6 g/m².

Example 3

A composition for forming a porous coating layer was prepared in the same manner as Example 1, except that $Al_2O_3$ powder, the first binder, the second binder and the third binder were prepared at a weight ratio of 70:2:24:4, and the third binder was introduced together with the first binder and the second binder during the preparation of the binder composition. The composition was controlled to have a solid content of 20 wt %. Herein, PVDF-CTFE (Solef 32008 available from Solvay) was used as the third binder.

Meanwhile, when the third binder, PVDF-CTFE (Solef 32008 available from Solvay), was formed into a binder specimen having a thickness of 0.4 mm by pressurization at 190° C., and the binder specimen was analyzed by dynamic mechanical analysis (DMA) using DMA Q800 available from TA Instruments. It was shown that the binder specimen had a tan δ peak at −7.56° C.

Then, a porous polymer substrate was prepared, and the composition was applied to one surface of the substrate to obtain a separator for a lithium secondary battery provided with a porous coating layer formed on one surface of the porous polymer substrate and including the binders mixed with the inorganic particles. The total coating amount of the porous coating layer was 6.48 g/m².

Example 4

A composition for forming a porous coating layer was prepared in the same manner as Example 1, except that $Al_2O_3$ powder, the first binder, the second binder and the third binder were prepared at a weight ratio of 72:2:22:4, and the third binder was introduced together with the first binder and the second binder during the preparation of the binder composition. The composition was controlled to have a solid content of 20 wt %. Herein, PVDF-CTFE (Solef 32008 available from Solvay) was used as the third binder.

Then, a porous polymer substrate was prepared, and the composition was applied to one surface of the substrate to obtain a separator for a lithium secondary battery provided with a porous coating layer formed on one surface of the porous polymer substrate and including the binders mixed with the inorganic particles. The total coating amount of the porous coating layer was 6.8 g/m².

Example 5

A composition for forming a porous coating layer was prepared in the same manner as Example 1, except that $Al_2O_3$ powder, the first binder, the second binder and the third binder were prepared at a weight ratio of 70:2:22:6, and the third binder was introduced together with the first binder and the second binder during the preparation of the binder composition. The composition was controlled to have a solid content of 20 wt %. Herein, PVDF-CTFE (Solef 32008 available from Solvay) was used as the third binder.

Then, a porous polymer substrate was prepared, and the composition was applied to one surface of the substrate to obtain a separator for a lithium secondary battery provided with a porous coating layer formed on one surface of the porous polymer substrate and including the binders mixed with the inorganic particles. The total coating amount of the porous coating layer was 6.96 g/m².

Example 6

A composition for forming a porous coating layer was prepared in the same manner as Example 5, except that PVDF-HFP (Solef 20808 available from Solvay) was used as the second binder. The composition was controlled to have a solid content of 20 wt %.

Then, a porous polymer substrate was prepared, and the composition was applied to one surface of the substrate to obtain a separator for a lithium secondary battery provided with a porous coating layer formed on one surface of the porous polymer substrate and including the binders mixed with the inorganic particles. The total coating amount of the porous coating layer was 6.96 g/m².

Meanwhile, when the second binder, PVDF-HFP (Solef 20808 available from Solvay), was formed into a binder specimen having a thickness of 0.4 mm by pressurization at 190° C., and the binder specimen was analyzed by dynamic mechanical analysis (DMA) using DMA Q800 available from TA Instruments. It was shown that the binder specimen had a tan δ peak at 11.95° C.

Comparative Example 1

A composition for forming a porous coating layer was prepared in the same manner as Example 1, except that the first binder was not used, and PVDF-HFP (Solef 21510 available from Solvay) used as the second binder in Example 1 was used alone as a binder for the composition for forming a porous coating layer. Then, the composition was applied to both surfaces of the porous polymer substrate by using the same materials and method as Example 1 to obtain a separator for a lithium secondary battery provided with porous coating layers including the binder mixed with the inorganic particles.

Comparative Example 2

A composition for forming a porous coating layer was prepared in the same manner as Example 3, except that the first binder was not used, and $Al_2O_3$ powder, the second binder and the third binder were prepared at a weight ratio of 65:30:5. The composition was controlled to have a solid content of 20 wt %. Then, the composition was applied to both surfaces of the porous polymer substrate by using the same materials and method as Example 1 to obtain a separator for a lithium secondary battery provided with porous coating layers including the binders mixed with the inorganic particles.

Comparative Example 3

A composition for forming a porous coating layer was prepared in the same manner as Example 3, except that the first binder was not used, and $Al_2O_3$ powder, the second binder and the third binder were prepared at a weight ratio of 65:25:10. The composition was controlled to have a solid content of 18 wt %. Then, the composition was applied to both surfaces of the porous polymer substrate by using the same materials and method as Example 1 to obtain a separator for a lithium secondary battery provided with porous coating layers including the binders mixed with the inorganic particles.

Comparative Example 4

A composition for forming a porous coating layer was prepared in the same manner as Example 1, except that PVDF-HFP-AA (Solef 75130 available from Solvay) was used as the first binder, and $Al_2O_3$ powder, the first binder and the second binder were prepared at a weight ratio of 70:15:15. The composition was controlled to have a solid content of 20 wt %. Then, the composition was applied to both surfaces of the porous polymer substrate by using the same materials and method as Example 1 to obtain a separator for a lithium secondary battery provided with porous coating layers including the binders mixed with the inorganic particles.

When the first binder, PVDF-HFP-AA (Solef 75130 available from Solvay), was formed into a binder specimen having a thickness of 0.4 mm by pressurization at 190° C., and the binder specimen was analyzed by dynamic mechanical analysis (DMA) using DMA Q800 available from TA Instruments. It was shown that the binder specimen had a tan δ peak at 20.5° C.

Evaluation

Figure 5:
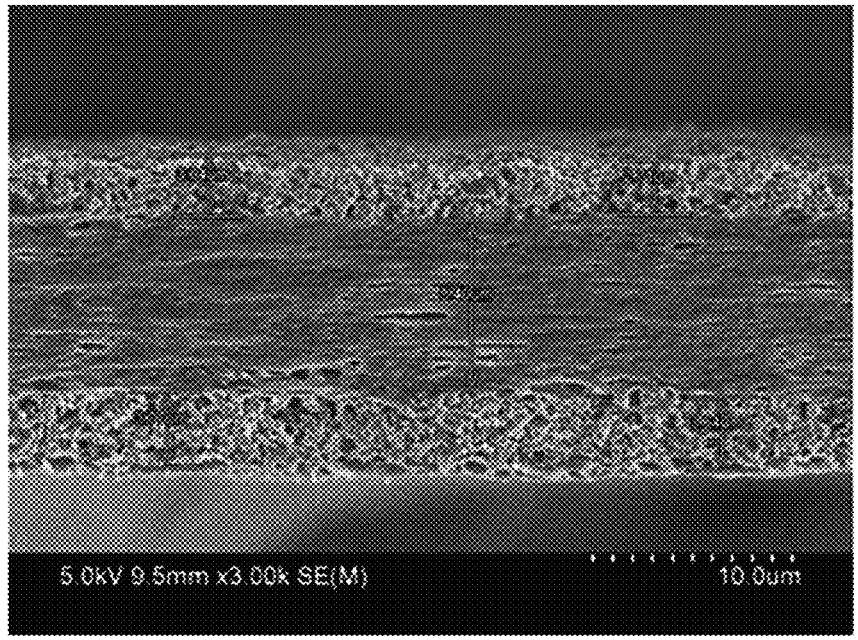
FIG. 5 and FIG. 6 show scanning electron microscopic (SEM) images illustrating the section of the separator for a lithium secondary battery according to Example 1 and that of the separator according to Comparative Example 1, respectively.
Figure 6:
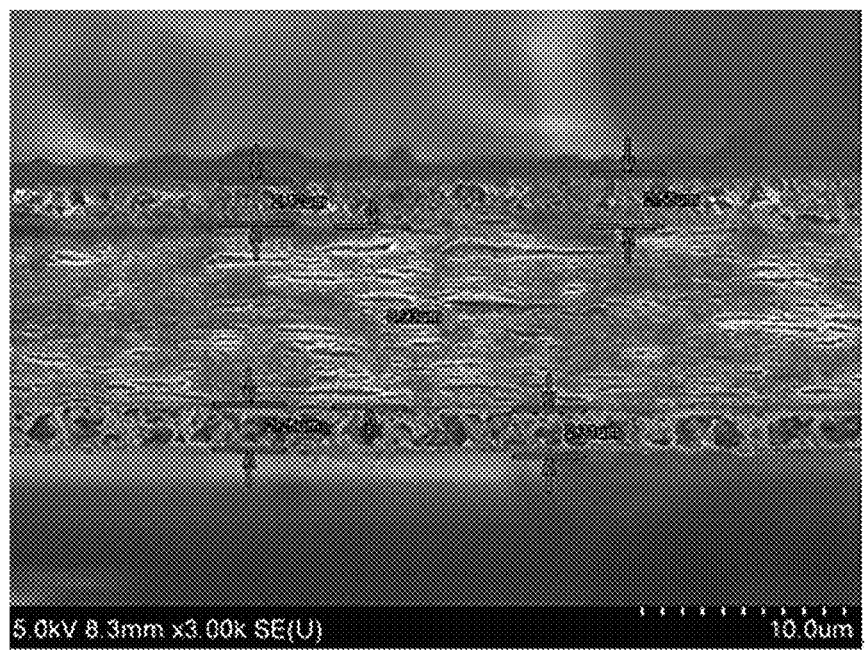

The separator for a lithium secondary battery obtained from each of Examples 1-6 and Comparative Examples 1-4 was evaluated in terms of packing density D of the porous coating layer, air permeability, adhesion to an electrode, peel strength, high-temperature shrinkage and electrical resistance by the following methods. The results are shown in the following Table 2 and Table 3. In addition, the scanning electron microscopic (SEM) images of the surface and section of each separator for a lithium secondary battery are shown in FIG. 5 and FIG. 6.

(1) Packing Density D of Porous Coating Layer

The packing density D of a porous coating layer is defined as density of the porous coating layer loaded to a height of 1 μm per unit area (m²) of a porous polymer substrate, and can be calculated according to the following formula:

$$D=(S_g-F_g)/(S_t-F_t),$$

wherein $S_g$ represents the weight (g) per unit area (m²) of a separator for a lithium secondary battery having a porous coating layer formed on a porous polymer substrate, $F_g$ represents the weight (g) per unit area (m²) of a porous polymer substrate, $S_t$ represents the thickness (μm) of a separator for a lithium secondary battery having a porous coating layer formed on a porous polymer substrate, and $F_t$ represents the thickness (μm) of a porous polymer substrate.

(2) Air Permeability of Separator for Lithium Secondary Battery

The air permeability (Gurley) was determined according to the method of ASTM D726-94. Herein, the Gurley type air permeability refers to resistance against air flow, and was determined by using a Gurley densometer. Each of the air permeability values defined herein is shown as a time (i.e. air permeation time) required for 100 cc of air to pass through a section of 1 in² of each of the separators according to Examples 1 and 2 and Comparative Example 1 under a pressure of 12.2 inH$_2$O.

(3) Adhesion to Electrode

Negative electrode slurry was prepared by mixing artificial graphite as a negative electrode active material, denka black (carbon black) as a conductive material and polyvinylidene fluoride (PVDF) as a binder at a weight ratio of 75:5:25 and adding N-methyl pyrrolidone (NMP) as a solvent to the resultant mixture.

The negative electrode slurry was coated on a copper current collector to a loading amount of 3.8 mAh/cm², followed by drying, to obtain a negative electrode including a negative electrode active material layer.

Each separator for a lithium secondary battery obtained from Examples 1-6 and Comparative Examples 1-3 was stacked on the negative electrode in such a manner that the surface of the porous coating layer of each separator might face the negative electrode active material layer, and the resultant structure was laminated with a lamination device. Then, the resultant sample was introduced to a UTM instrument to measure the force required for peeling the electrode-separator (porous coating layer) adhesive surface at a rate of 100 mm/min.

(4) Evaluation of High-Temperature Shrinkage

The high-temperature shrinkage of a separator was calculated by preparing a specimen of the separator for a lithium secondary battery according to each of Examples 1-6 and Comparative Examples 1-4 into a size of 50 mm (length)×50 mm (width), allowing each specimen to stand in an oven heated to 150° C. for 30 minutes, recovering the specimen, and then calculating the high-temperature shrinkage from a change in length in the machine direction (MD) and the transverse direction (TD) according to the following formula:

High-Temperature Shrinkage (%)=[(Length before shrinking−Length after shrinking)/Length before shrinking]×100

(5) Evaluation of Electrical Resistance of Separator

The electrical resistance of the separator for a lithium secondary battery according to each of Examples 1-6 and Comparative Examples 1-4 was determined as follows. A coin cell was obtained by using each separator, the coin cell was allowed to stand at room temperature for 1 day, and then the electrical resistance of each coin cell was determined by using electrochemical impedance spectroscopy. The coin cell was manufactured as follows.

Manufacture of Negative Electrode

First, artificial graphite as a negative electrode active material, denka black (carbon black) as a conductive material and polyvinylidene fluoride (PVDF) as a binder were mixed at a weight ratio of 75:5:25, and N-methyl pyrrolidone as a solvent was added to the resultant mixture to prepare negative electrode slurry.

The negative electrode slurry was coated on a copper current collector to a loading amount of 3.8 mAh/cm², followed by drying, to obtain a negative electrode.

Manufacture of Positive Electrode

First, LiCoO$_2$ as a positive electrode active material, denka black as a conductive material and polyvinylidene fluoride (PVDF) as a binder were mixed at a weight ratio of 85:5:15, and the resultant mixture was added to N-methyl pyrrolidone (NMP) as a solvent to prepare positive electrode active material slurry. The positive electrode active material slurry was coated on a sheet-like aluminum current collector, followed by drying, to form a positive electrode active material layer to a final positive electrode loading amount of 3.3 mAh/cm².

Manufacture of Coin Cell

The separator for a lithium secondary battery according to each of Examples 1-6 and Comparative Examples 1-4 was interposed between the negative electrode and the positive electrode obtained as described above, and a non-aqueous electrolyte (1 M LiPF$_6$, ethylene carbonate (EC)/propylene carbonate (PC)/diethyl carbonate (DEC), volume ratio=3:3:4) was injected thereto to obtain a coin cell.

(6) Evaluation of Peel Strength

Each of the separator samples obtained from Examples 1-6 and Comparative Examples 1-4 was cut into a size of 100 mm (length)×15 mm (width). A double-sided adhesive tape was bonded to glass and the specimen was bonded to the opposite surface of the double-sided tape to prepare a structure. Then, the resultant structure was fixed to an instrument for measuring adhesive strength, LF plus available from LLOYD Instrument, the separator specimen of the upper part was peeled at a rate of 300 mm/min with an angle of 180°, and the peel strength was measured.

The following Table 1 shows the content ratio of the first binder, the second binder and the third binder in the binder resin used for each of Examples 1-6 and Comparative Examples 1-4.

TABLE 1

| | Total binder 100 wt % | | | Content ratio (wt %) of inorganic particles/binder |
|---|---|---|---|---|
| | First binder (wt %) | Second binder (wt %) | Third binder (wt %) | |
| Ex. 1 | 14.3 | 85.7 | 0 | 65:35 |
| Ex. 2 | 16.7 | 83.3 | 0 | 65:35 |
| Ex. 3 | 6.7 | 80.2 | 13.3 | 70:30 |
| Ex. 4 | 7.1 | 78.6 | 14.3 | 70:30 |
| Ex. 5 | 6.7 | 73.3 | 20 | 70:30 |
| Ex. 6 | 6.7 | 80.2 | 13.3 | 70:30 |
| Comp. Ex. 1 | 0 | 100 | 0 | 65:35 |
| Comp. Ex. 2 | 0 | 85.7 | 14.3 | 65:35 |
| Comp. Ex. 3 | 0 | 71.4 | 24.6 | 65:35 |
| Comp. Ex. 4 | 50 | 50 | 0 | 70:30 |

TABLE 2

| | | Ex. 1 | Ex. 2 | Ex. 3 | Ex. 4 | Ex. 5 | Ex. 6 |
|---|---|---|---|---|---|---|---|
| Thickness of porous polymer substrate (μm) | | 9 | 9 | 9 | 9 | 9 | 9 |
| Thickness of porous coating layer (μm) | | 4.6 | 4.8 | 5.0 | 5.02 | 5.6 | 5.6 |
| Loading amount of porous coating layer (g/m²) | | 5.8 | 5.6 | 6.48 | 6.8 | 6.96 | 6.96 |
| Packing density of porous coating layer D (g/cm³) | | 1.26 | 1.16 | 1.30 | 1.35 | 1.24 | 1.24 |
| Air permeability of porous polymer substrate (sec/100 cc) | | 92 | 92 | 92 | 98 | 98 | 98 |
| Air permeability of porous coating layer (sec/100 cc) | | 155 | 142 | 145 | 147 | 153 | 153 |
| Negative electrode-separator adhesion (gf/25 mm) | | 100 | 65 | 60 | 57 | 52 | 51 |
| High-temperature shrinkage (%) | MD | 61 | 62 | 58 | 56 | 56 | 46 |
| | TD | 62 | 64 | 56 | 54 | 52 | 46 |
| Peel strength (gf/15 mm) | Top | 149 | 88 | 91 | 130 | 191 | 120 |
| | Back | 66 | 60 | 124 | 77 | 120 | 90 |
| Resistance (Ω) | | 0.72 | 0.78 | 0.78 | 0.73 | 0.74 | 1.05 |
| Generation of microvoids | | No | No | No | No | No | No |

TABLE 3

| | | Comp. Ex. 1 | Comp. Ex. 2 | Comp. Ex. 3 | Comp. Ex. 4 |
|---|---|---|---|---|---|
| Thickness of porous polymer substrate (μm) | | 9 | 9 | 9 | 9 |
| Thickness of porous coating layer (μm) | | 7.3 | 5.3 | 5.0 | 5.8 |
| Loading amount of porous coating layer (g/m²) | | 7 | 6.7 | 6.6 | 7.0 |
| Packing density of porous coating layer D (g/cm³) | | 1.09 | 1.27 | 1.32 | 1.2 |
| Air permeability of porous polymer substrate (sec/100 cc) | | 77 | 92 | 92 | 98 |
| Air permeability of porous coating layer (sec/100 cc) | | 189 | 167 | 157 | 129 |
| Negative electrode-separator adhesion (gf/25 mm) | | 58.6 | 67 | 75 | 25 |
| High-temperature shrinkage (%) | MD | 60 | 58 | 60 | 44 |
| | TD | 58 | 60 | 60 | 49 |
| Peel strength (gf/15 mm) | Top | 70 | 246 | 259 | 58 |
| | Back | 80 | 164 | 81 | 65 |
| Resistance (Ω) | | 0.92 | 1.0 | 1.01 | 0.83 |
| Generation of microvoids | | Yes | Yes | Yes | Yes |

It can be seen from Table 2 and Table 3 that each of separators of Examples 1-6 according to the present disclosure has excellent electrical properties as compared to the separators of Comparative Examples 1-4. When comparing Examples 1 and 2 with Comparative Examples 1 and 2 using the same amount of binder, each of the separators according to Examples 1 and 2 ensures a peel strength sufficient for battery operation, generates no microvoid, unlike Comparative Example 1, and shows excellent resistance characteristics. In addition, in terms of negative electrode/separator adhesion, Examples 1 and 2 show higher adhesion as compared to Comparative Example 1.

Meanwhile, each of Examples 3-6 using a smaller amount of binder as compared to Comparative Examples 1-4 ensures a negative electrode/separator adhesion and peel strength sufficient for battery operation and shows better results in terms of generation of microvoids and resistance characteristics as compared to Comparative Example 1-4.

Meanwhile, in the case of Comparative Example 4, it uses a reduced amount of second binder to cause degradation of negative electrode-separator adhesion as compared to Examples 1-3.

(5) Scanning Electron Microscopic (SEM) Image

The section of the separator for a lithium secondary battery obtained from each of Example 1 and Comparative Example 1 was photographed by SEM. FIG. 5 and FIG. 6 show the sectional images of Example 1 and Comparative Example 1, respectively. When comparing FIG. 5 with FIG. 6, it can be seen that the porous coating layer forming the separator for a lithium secondary battery according to Example 1 is thicker than the porous coating layer forming the separator for a lithium secondary battery according to Comparative Example 1, causes no generation of microvoids, and thus shows improved safety.

What is claimed is:

1. A separator for a lithium secondary battery comprising:
a porous polymer substrate; and
a porous coating layer on at least one surface of the porous polymer substrate,
wherein the porous coating layer comprises a binder and inorganic particles wherein each inorganic particles has a binding state,
wherein the binder bonds the inorganic particles to one another, wherein the inorganic particles retain their binding states, and wherein the binder bonds the inorganic particles to the porous polymer substrate and the inorganic particles retain their binding states,
the inorganic particles form interstitial volumes, wherein the inorganic particles are in contact with one another, and the interstitial volumes among the inorganic particles become vacant spaces to form pores of the porous coating layer,
the binder comprises a first binder and a second binder, the first binder having a tan δ peak at 15° C. to 27.6° C. and the second binder having a tan δ peak at 8° C. to 20.2° C., as determined by dynamic mechanical analysis (DMA) of a specimen of the first binder and a specimen of the second binder each having a thickness of 0.4 mm after pressurization at 190° C., and
the first binder is present in an amount of 5 wt % to 20 wt % and the second binder is present in an amount of 80 wt % to 95 wt %, based on 100 wt % of a combined weight of the first binder and the second binder.

2. The separator for the lithium secondary battery according to claim 1, wherein the binder further comprises a third binder, the third binder having a tan δ peak at −12° C. to 0° C., as determined by dynamic mechanical analysis (DMA) of a specimen of the third binder having a thickness of 0.4 mm after pressurization at 190° C.

3. The separator for the lithium secondary battery according to claim 2, wherein the third binder is present in an amount of 8 wt % to 25 wt % based on 100 wt % of a total weight of the first binder, the second binder and the third binder.

4. The separator for the lithium secondary battery according to claim 3, wherein the third binder comprises poly (vinylidene fluoride-co-chlorotrifluoroethylene) (PVDF-CTFE).

5. The separator for the lithium secondary battery according to claim 1, the specimen of the first binder has a behavior at a phase angle of less than 45°, as determined by an advanced rheometric expansion system (ARES) at 190° C.

6. The separator for the lithium secondary battery according to claim 1, wherein the specimen of the second binder has a behavior at a phase angle of 45° or more, as determined by an advanced rheometric expansion system (ARES) at 190° C.

7. The separator for the lithium secondary battery according to claim 1, wherein the first binder is present in an amount of 5 wt % to 15 wt % and the second binder is present in an amount of 85 wt % to 95 wt %, based on 100 wt % of the combined weight of the first binder and the second binder.

8. The separator for the lithium secondary battery according to claim 1, wherein the first binder satisfying the tan δ peak condition is at least one of poly(vinylidene fluoride-tetrafluoroethylene) (PVDF-TFE), poly(vinylidene fluoride-trifluoroethylene) (PVDF-TrFE), or PVDF-HFP-acrylic acid graft copolymer (PVDF-HFP-AA).

9. The separator for the lithium secondary battery according to claim 1, wherein the second binder satisfying the tan δ peak condition is poly(vinylidene fluoride-hexafluoropropylene) (PVDF-HFP).

10. The separator for the lithium secondary battery according to claim 1, wherein the porous coating layer further comprises a dispersing agent.

11. A lithium secondary battery, comprising:
a positive electrode,
a negative electrode, and
a separator interposed between the positive electrode and the negative electrode,
wherein the separator is the separator for a lithium secondary battery as defined in claim 1.

* * * * *